Patented Feb. 5, 1929.

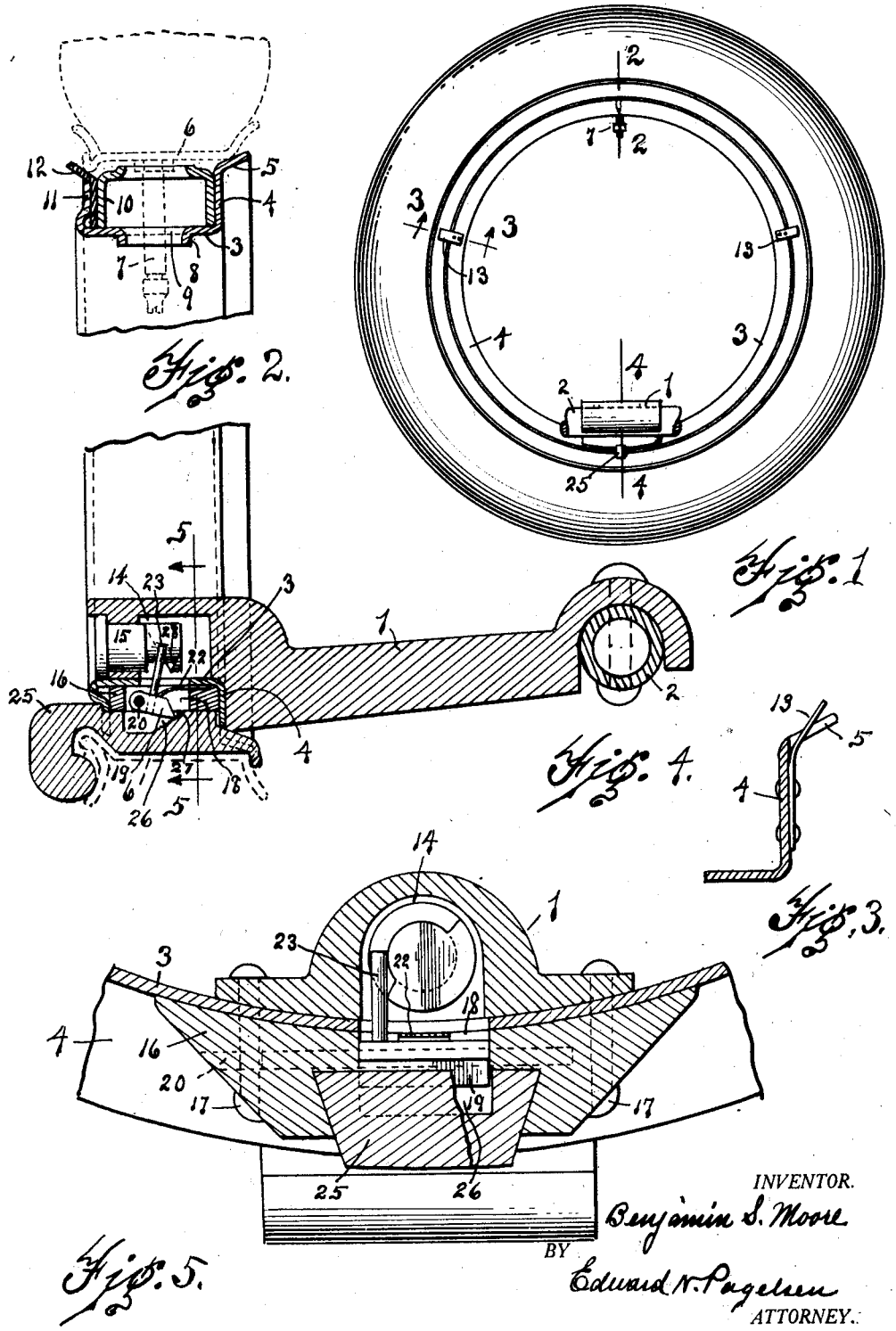

1,701,306

UNITED STATES PATENT OFFICE.

BENJAMIN S. MOORE, OF DETROIT, MICHIGAN.

RIM LOCK.

Application filed September 23, 1927. Serial No. 221,423.

This invention relates to means for locking demountable rims for automobile wheels to supports or carriers, and its object is to provide a device of this character which shall be of great strength and which shall automatically lock the rim to the support.

This invention is of the general character as that shown in my co-pending application, Ser. No. 191,685, filed May 16, 1927, and makes use of many of the details shown therein.

This invention consists in a support for a tire rim and a key operated lock mounted therein embodying a pivoted spring pressed pawl, and a keeper of hard metal adapted to grip the rim when in position on the support and extending between the rim and support, the keeper being formed with a notch to receive said pawl. It further consists of the details of construction illustrated in the accompanying drawing and particularly pointed out in the claims.

In the drawing, Fig. 1 is an elevation of a support embodying the present invention and a rim and tire mounted thereon. Figs. 2, 3 and 4 are sections on the lines 2—2, 3—3 and 4—4 of Fig. 1 respectively. Fig. 5 is a section on the line 5—5 of Fig. 4 on a larger scale.

Similar reference characters refer to like parts throughout the several views.

The bracket 1 extends rearwardly from any desired rear cross member 2 of an automobile chassis and is rigidly attached thereto. Attached to this bracket is an annular member 3, which, for most of its circumference, is formed with a rear side 4 and a flange 5 against which the rim 6 rests when on the support. At the place where the usual tire-valve tube 7 passes through the support, a flange may be formed around the hole 9, and I prefer to secure a small saddle 10 between the sides 4 and 11 of the member 3 to render removal of the rim more difficult. A small plate 12 at this point serves to assist in retaining the rim on the support. At several points the flange 4 is notched to permit the outer ends of resilient plates 13 to engage the rim and prevent rattling.

The bracket 1 is formed with a recess 14 and is drilled to receive the rotatable lock-barrel 15 of any desired construction. A block of metal 16 is attached to the ring 3 in any desired manner, rivets 17 being shown. In a recess 18 in this block is a pawl 19, mounted on a pin 20 extending across this recess and preferably held in position by a rivet 17. A spring 22 attached to the member 3 normally holds this pawl outwardly from the recess. A stem 23 attached to the pawl 19 extends through a hole in the member 3 into a spiral groove in the lock-barrel 15 so that when the lock-barrel is turned counter-clockwise, the stem 23 will be swung to the left in Fig. 4 and the pawl swung into the recess 18.

A keeper 25 is fitted onto the tire rim 6, and a proper keeper will be designed for each particular type of rim. The keeper is adapted to grip the sides of the rim when it is being mounted on the support and it slides into notches formed in the sides of the member 3. This keeper is formed with a notch 26 whose bottom is corrugated to insure engagement with the pawl 19 and the general curvature of this bottom is so much shallower than the path of the point of the pawl that the pawl will engage this corrugated surface whether the keeper is pushed in so far as shown in Fig. 4 or quite a bit farther. I prefer the beginning of this engaging surface at 27 to be a marked shoulder so that sufficient metal will always be engaged by the pawl.

The block 16 and the keeper 25 are preferably formed with inclined sides, as shown in Fig. 5, which results in a structure of great strength.

The normal position of the parts is shown in Fig. 4, the keeper and rim being held in position by means of the pawl. Counter clockwise rotation of the lock-barrel results in the helical surface 28 engaging the stem 23 and in swinging the pawl 19 up into the recess 18. This allows the keeper and the rim to be swung out in the upper part of the support as a pivot and then removed. The lock is then returned to normal position and the key removed. As the latch is spring-pressed, it is always in position to engage the keeper when it is slipped into the position shown in the drawings.

The details of construction and the proportions of the parts may all be changed by those skilled in the art without departing from the spirit of my invention as set forth in the following claims.

I claim:—

1. In a rim carrier, the combination of an annular rim support and a bracket to which said support is attached, a lock mounted within the bracket, a pawl pivotally mounted within the bracket and adapted to be swung in by said lock, a spring to swing out the pawl, a keeper adapted to be attached to a demountable rim and to be moved transversely of said annular rim support and formed with a notch to receive said pawl, said carrier being notched to receive said keeper.

2. In a rim carrier, the combination of a bracket mounted on an automobile, an annular member attached thereto and a metal block secured to the bracket and annular member, said block being formed with a groove having outwardly converging sides, a keeper adapted to engage the sides of a rim and formed to fit the groove in said block, and a locking mechanism mounted in said carrier adapted to prevent the removal of said keeper from said groove.

3. In combination with a circular rim-support which is channel-shaped in cross-section, a bracket on which said support is mounted, a lock mounted within said bracket, a stem rotatable adjacent the lock and a pawl attached to the stem, a spring to swing the pawl outwardly, said lock being adapted to swing the latch inwardly, a rim adapted to be mounted on said support and a keeper engaging the sides of the rim when in position and extending across said circular rim support and adapted to be engaged by said latch to secure the keeper and rim to the support.

4. In a rim carrier, the combination of an annular rim support and a bracket to which said support is attached, a lock mounted within the bracket, a pawl pivotally mounted within the bracket and adapted to be swung in by said lock, a spring to swing out the pawl, a keeper adapted to be attached to a demountable rim and to be moved transversely of said annular rim support and formed with a notch to receive said pawl, said carrier being notched to receive said keeper, the bottom of the notch in the keeper being corrugated and of a greater curvature than the path of the free end of said pawl.

5. In a rim carrier, the combination of an annular rim support and a bracket to which said support is attached, a lock mounted within the bracket, a pawl pivotally mounted within the bracket and adapted to be swung in by said lock, a spring to swing out the pawl, a keeper adapted to be attached to a demountable rim and to be moved transversely of said annular rim support and formed with a notch to receive said pawl, said carrier being notched to receive said keeper, the axis of said pawl being substantially at right angles to a plane containing the axis of the rim.

6. In a carrier for demountable rims for vehicle tires, the combination of a rim support and a bracket mounted on a vehicle, a lock carried by the bracket, a pawl normally in operative position and adapted to be moved to inoperative position by the lock, and a keeper adapted to engage the rim when mounted on the support and formed with a notch to receive the pawl when in operative position, said bracket being formed with a groove into which the keeper may slide to be engaged by said pawl.

7. In a carrier for demountable rims for vehicle tires, the combination of a rim support and a retaining member, a keeper adapted to engage the demountable rim, a lock carried by the retaining member, said retaining member having a recess adapted to receive the keeper, and an engaging member between the retaining member and the keeper normally preventing the removal of the keeper from the recess in the retaining member and the rim from the support but movable by the lock to release the keeper and rim.

8. In a carrier for demountable rims for vehicle tires, the combination of a rim support and a retaining member, a keeper adapted to engage the demountable rim, a lock carried by the retaining member, said retaining member having a recess adapted to receive the keeper and an engaging member between the retaining member and the keeper normally preventing the removal of the keeper from the recess in the retaining member and the rim from the support but movable by the lock to release the keeper and rim, said recess in the retaining member being a dove-tail groove in which the keeper is slidably fitted.

9. In combination with a bracket and a circular rim-support permanently attached thereto, a lock mounted in said bracket, a lock-frame mounted in the rim support, a locking member carried in the lock-frame, and means operatively connecting the lock and latch to release the rim from its support.

BENJAMIN S. MOORE.